No. 641,533. Patented Jan. 16, 1900.
J. M. MYERS.
VELOCIPEDE.
(Application filed Sept. 8, 1899.)

(No Model.)

Witnesses
Jas. V. McCutchan
Geo. H. Chandlee

James M. Myers Inventor
By his Attorneys,
C. A. Snow & Co.

UNITED STATES PATENT OFFICE.

JAMES M. MYERS, OF KIRBYVILLE, TEXAS.

VELOCIPEDE.

SPECIFICATION forming part of Letters Patent No. 641,533, dated January 16, 1900.

Application filed September 8, 1899. Serial No. 729,868. (No model.)

*To all whom it may concern:*

Be it known that I, JAMES M. MYERS, a citizen of the United States, residing at Kirbyville, in the county of Jasper and State of Texas, have invented a new and useful Velocipede, of which the following is a specification.

This invention relates to velocipedes, and it has for its object to provide a simple and efficient device of this nature adapted to carry a number of passengers in addition to the operator and in which the arms may be employed to assist the feet in operating the driving mechanism.

Figure 1:
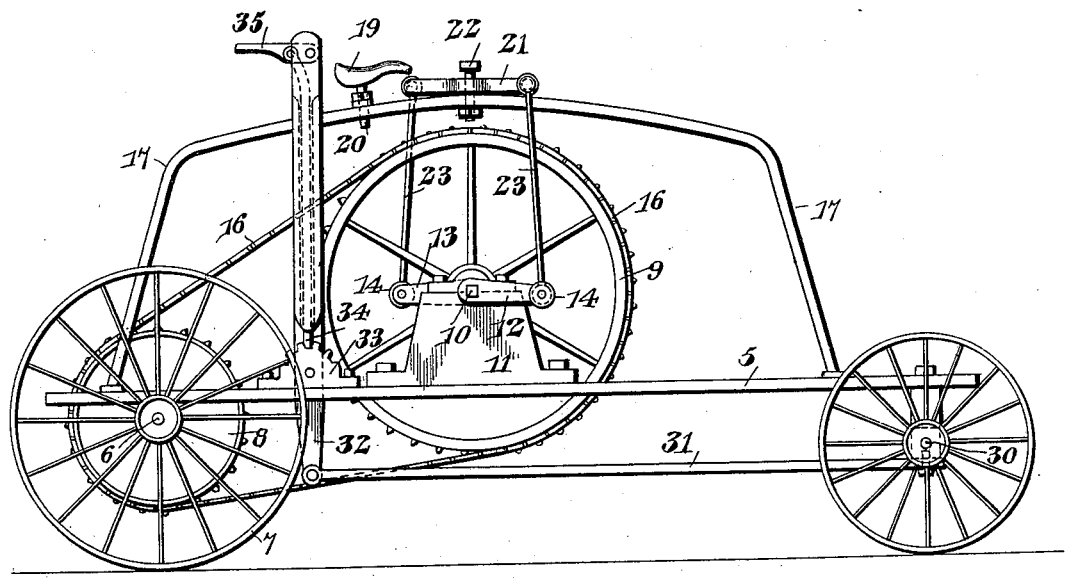
Figure 2:
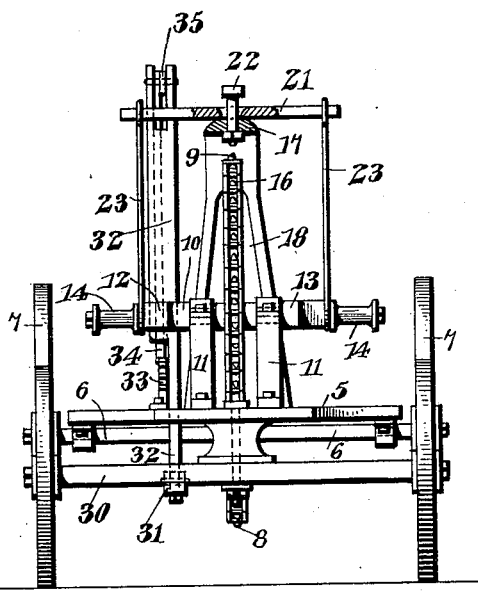

In the drawings forming a portion of this specification, and in which like numerals of reference designate corresponding parts in both views, Figure 1 is a side elevation of the velocipede complete. Fig. 2 is a front end view of the velocipede.

Referring now to the drawings, 5 represents a platform, adjacent to the rear end of which and upon the under face thereof is journaled a shaft 6, having supporting traction-wheels 7, fixed thereto and through the medium of which the velocipede is adapted to be driven. Upon the axle 6 is a band or sprocket wheel 8, fixed thereto and rotating in a longitudinal slot in the platform. A second band or sprocket wheel 9 is fixed to a shaft 10, journaled at its ends in pillow-blocks 11 and provided exteriorly of said blocks with cranks 12 and 13, having pedals 14 thereon, through the medium of which said cranks may be engaged by the feet of the operator and moved to rotate the wheel 9. Connecting the wheels 8 and 9 is a belt or chain 16 to transmit motion from one to the other.

Connected at its front and with the forward portion of the platform 5 and at its rear end with the rear portion of the platform is a seat-support 17, the rear end of which is bifurcated, as shown at 18, to straddle the sprocket 8. The seat-support 17 passes over and in alinement with the wheel 9 and in the rear of the vertical diameter of said wheel has affixed thereto a seat 19 through the medium of a post 20, held in place in the usual manner. The seat 19 is so positioned that the operator in sitting thereon may reach the pedals 14 with his feet.

A wabbling lever 21 is pivoted upon the upper side of the seat-support 17 through the medium of a pin 22 in alinement with the vertical diameter of the wheel 9, the outer ends of said lever having connection with the ends of the cranks 12 and 13 through the medium of pitmen 23. The lever 21 is rounded adjacent its ends to form handles to be grasped by the operator, and thus the operator when sitting upon the seat 19 may employ both his hands and his feet in driving the apparatus, the mounting of the lever 21 enabling the ends of said lever to describe circles equal in radius to the length of either crank 12 or 13.

In order to steer the apparatus, I pivotally connect a front axle 30 with the front end of the platform 5 through the medium of a king-bolt in the usual manner, and at one side of the king-bolt is pivoted a rod 31, which extends rearwardly and is pivoted to the lower end of a lever 32, fulcrumed in semicircular plates 33, the periphery of one of which is notched, as shown, to form a notched segment adapted to receive a bolt 34, slidably mounted in the upper portion of the lever 32, and adapted for reciprocation through the medium of a lever 35, connected with the bolt and pivoted to the lever 32. Thus it will be seen that the front or steering wheels of the machine may be adjusted and may be held in their adjusted positions, enabling the operator to give his entire energy to the operation of the machine.

In practice the platform 5 may be provided with seats for a number of passengers. It may be provided with an awning or may have a housing of glass or other material, and the specific construction and arrangement of the device may be altered without departing from the spirit of the invention.

It will be further understood that either sprockets and a chain or a belt and belt-wheels may be employed for communicating motion from the shaft 10 to the rear axle or that any other suitable gearing may be employed.

Having thus described the invention, what is claimed is—

A velocipede comprising a platform, a front axle pivoted to the platform, a rear axle having journals fixed to the platform and provided with fixed supporting-wheels, a gear-wheel fixed to the rear axle, pillow-blocks mounted upon the platform between the front and rear axle, a crank-shaft mounted in the pillow-blocks, a sprocket fixed to the crank-shaft, a chain connecting the sprockets, a seat-support attached at one end to the platform adjacent the front axle, and having its rear end bifurcated and straddling the sprocket of the rear axle, the extremities of the bifurcations being fixed to the platform in the rear of the rear axle, a seat upon the support, a lever pivoted transversely of the support, pitmen pivotally connected with the lever and with the cranks of the crank-axle, a seat mounted upon the support in the rear of said lever, a second lever pivoted upon the platform and extending above and below the platform, a connecting-rod attached at the lower end of the lever and to the front axle, a notched segment upon the platform, a hand-lever pivoted to the upper end of the second lever, and a reciprocatory dog mounted upon the second lever and attached to the hand-lever and adapted for engagement with the segment.

In testimony that I claim the foregoing as my own I have hereto affixed my signature in the presence of two witnesses.

JAMES M. MYERS.

Witnesses:
W. I. MYERS,
C. M. JONES.